Dec. 26, 1922.
H. J. BELCHER.
PICTURE PROJECTING MACHINE.
FILED FEB. 7, 1921.
1,440,330.
4 SHEETS—SHEET 2.
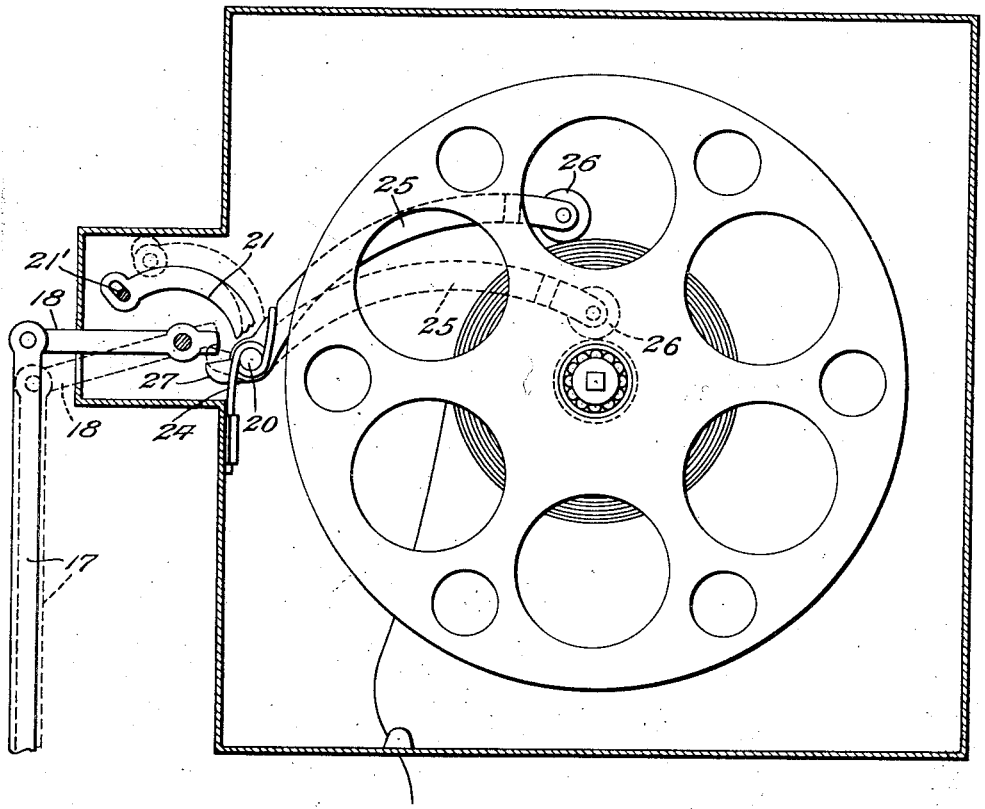
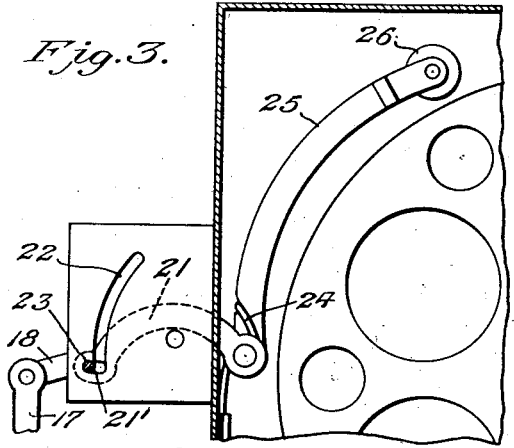
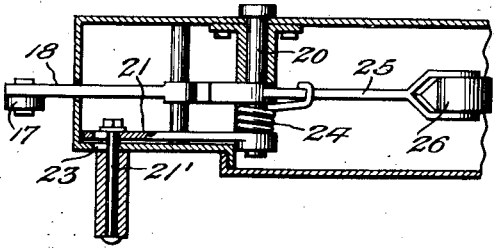
H. J. Belcher INVENTOR
BY Victor J. Evans ATTORNEY
WITNESS: Edwin F. McKee Dec. 26, 1922.
H. J. BELCHER.
PICTURE PROJECTING MACHINE.
FILED FEB. 7, 1921.
1,440,330.
4 SHEETS—SHEET 3.
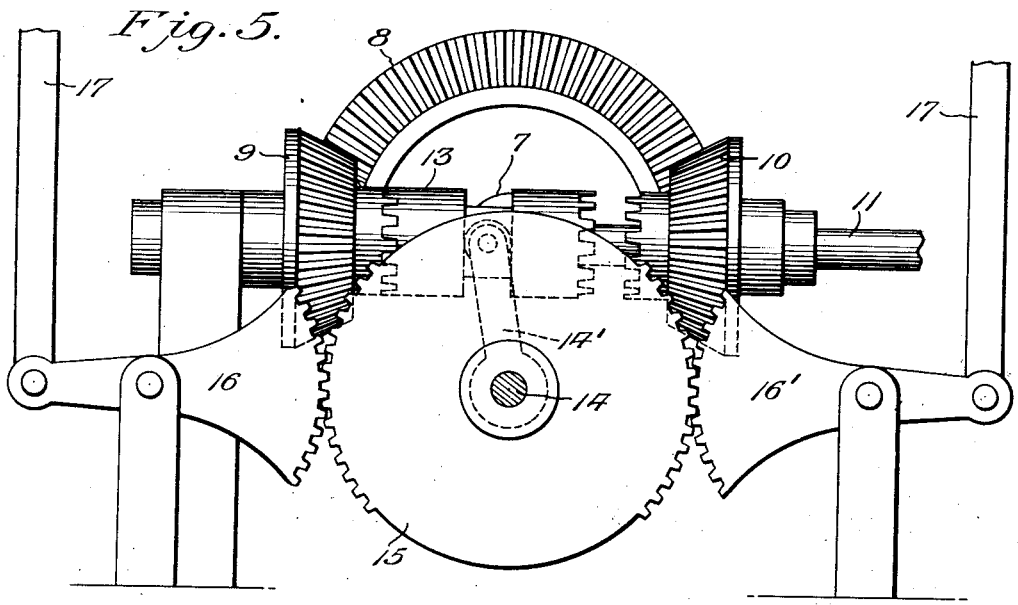
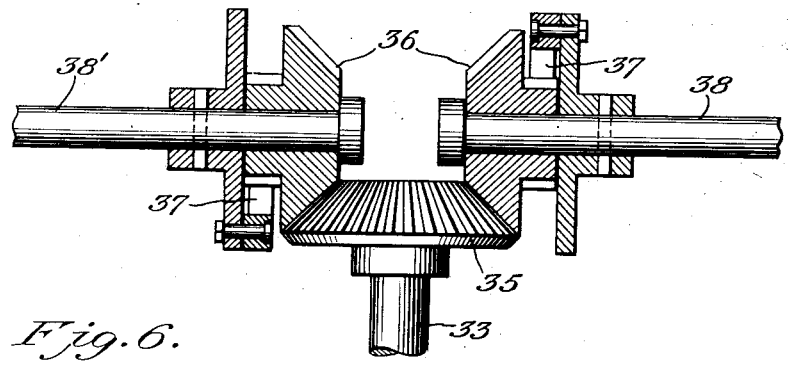
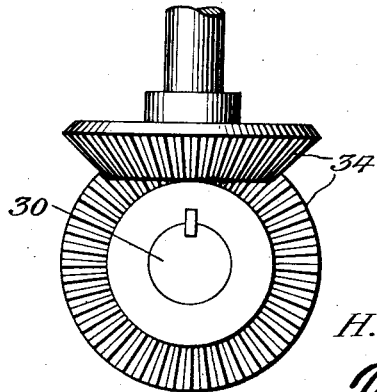
H. J. Belcher
INVENTOR
BY Victor J. Evans
ATTORNEY
WITNESS:

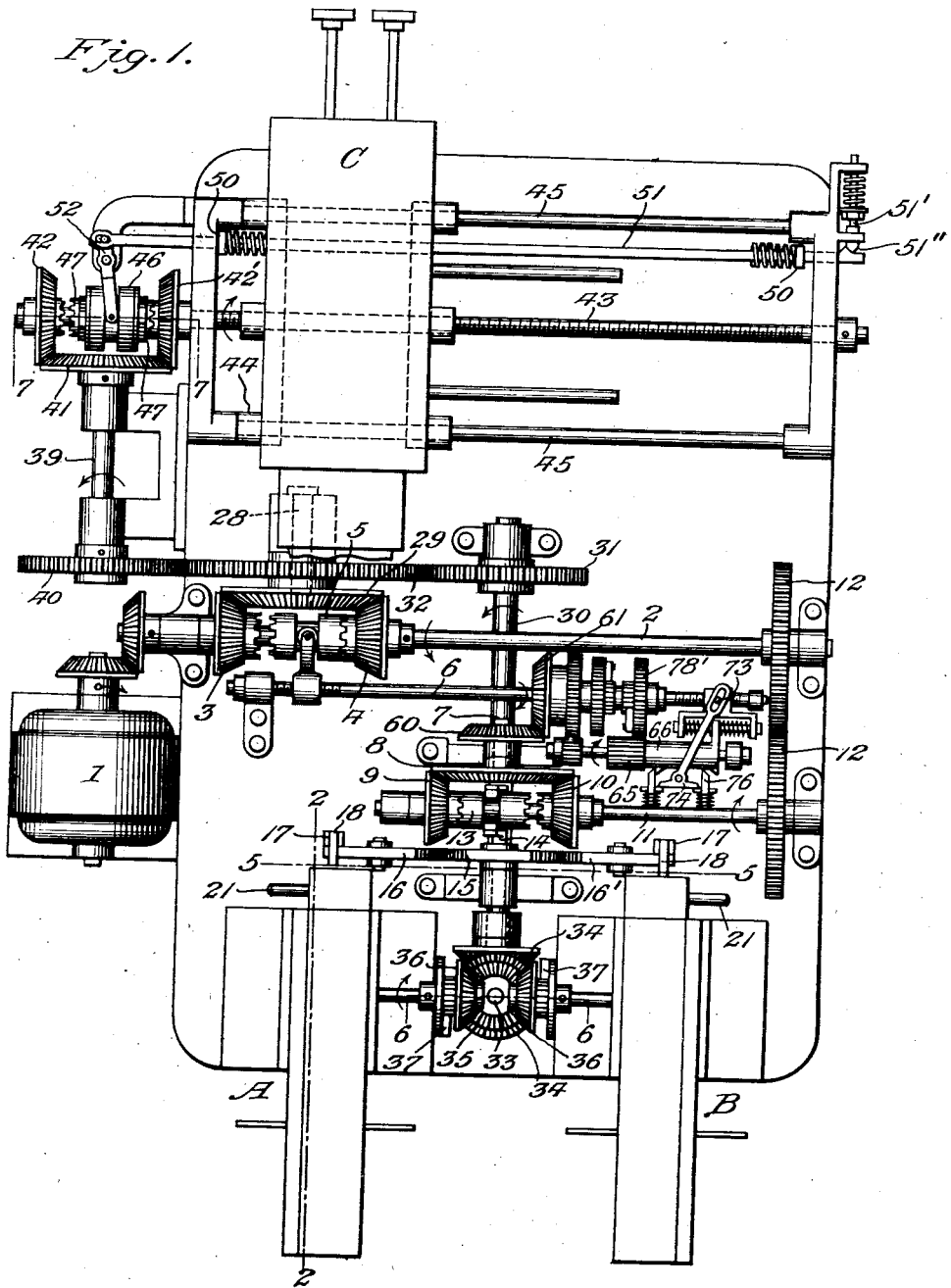

Dec. 26, 1922.
H. J. BELCHER.
PICTURE PROJECTING MACHINE.
FILED FEB. 7, 1921.
1,440,330.
4 SHEETS—SHEET 4.
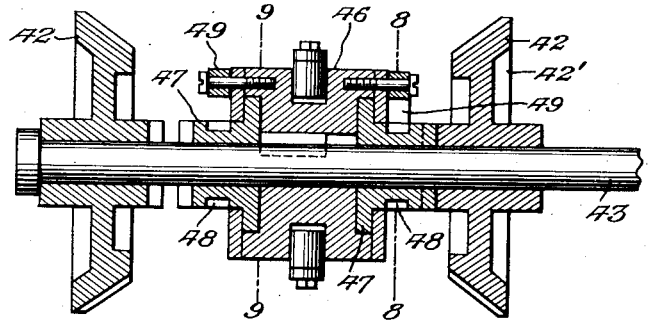
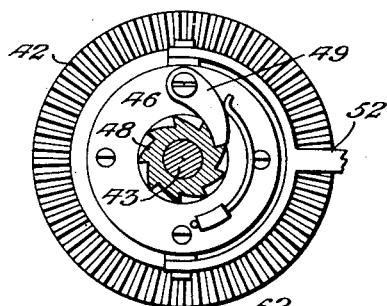
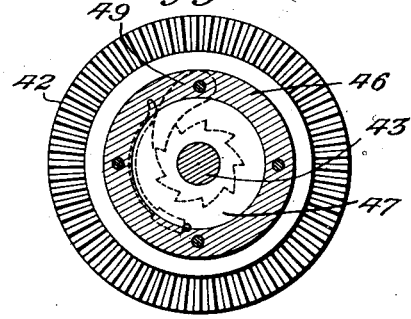
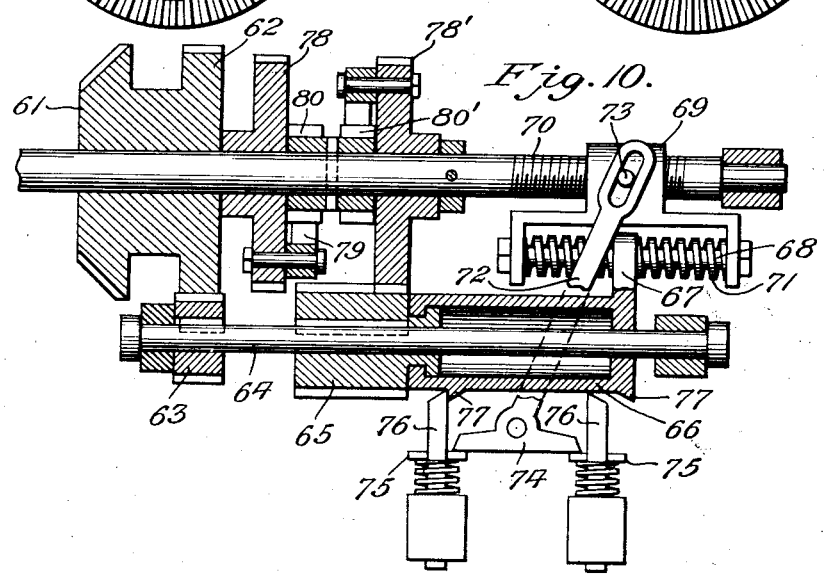
H. J. Belcher INVENTOR
BY Victor J. Evans
ATTORNEY
WITNESS:

Patented Dec. 26, 1922.

1,440,330

UNITED STATES PATENT OFFICE.

HAROLD JOS. BELCHER, OF ALGIERS, LOUISIANA.

PICTURE-PROJECTING MACHINE.

Application filed February 7, 1921. Serial No. 443,149.

*To all whom it may concern:*

Be it known that I, HAROLD JOS. BELCHER, a citizen of the United States, residing at Algiers, in the parish of Orleans and State of Louisiana, have invented new and useful Improvements in Picture-Projecting Machines, of which the following is a specification.

This invention relates to improvements in motion picture machines, the general object of the invention being to provide a pair of projecting machines with a single lamp house with means for automatically starting the operation of one projecting machine as soon as the film has been run through the other machine and for moving the lamp house from one machine to the other.

By the use of my invention waits between films are eliminated as the pictures of a new film will be thrown upon the screen just as soon as the first film has been completed. My invention permits the operator to start with a reel of film in the upper magazine of each machine and when the motor is started the first film will be shown and then the second and the operator can wait until the second film is nearly unwound before placing a new reel of film in the magazine of the first machine.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a diagrammatic plan view of the invention.

Figure 2 is a section on line 2—2 of Figure 1.

Figure 3 is a fragmentary view of the parts shown in Figure 2 with some of said parts in a different position.

Figure 4 is a horizontal section taken through Figure 3.

Figure 5 is a section on line 5—5 of Figure 1.

Figure 6 is a section on line 6—6 of Figure 1.

Figure 7 is a section on line 7—7 of Figure 1.

Figure 8 is a section on line 8—8 of Figure 7.

Figure 9 is a section on line 9—9 of Figure 7.

Figure 10 is an enlarged sectional view through the means for giving the screw shaft 6 its limited movement.

In these views A indicates one projecting machine and B a second projecting machine. A single lamp house C is used for the two machines, this lamp house being movable so that it can be aligned with either machine.

I provide a motor 1 for operating the mechanism and this motor is suitably connected with a main drive shaft 2. This main shaft carries the beveled gears 3 and 4 which are adapted to be connected with the shaft by means of clutch 5, actuated by the screw shaft 6 which is geared to a stub shaft 7, carrying the beveled gear 8. This gear 8 meshes with the beveled gears 9 and 10, carried by the shaft 11 which is geared to the main shaft 2 by the pinions 12. These gears 9 and 10 are adapted to be connected with shaft 11 by the sliding clutch 13 which is moved back and forth by the shaft 14 and forked arm 14'. This shaft 14 has secured thereto a pinion 15 with which engages a pair of segmental gears 16 and 16', these segmental gears being controlled by the rolls of film in the upper magazine in the following manner: The link 17 connects each segmental gear with a rocking arm 18 pivoted intermediate its ends to a part of the upper magazine. A shaft 20 is rotatably mounted in the upper magazine and this shaft is provided with a crank arm 21, the handle 21' of which extends through a slot 22 formed in one side of the magazine, the slot having a notch 23 in its wall for receiving the handle, which is movably attached to the arm, to hold the shaft 20 against the action of the spring 24 which tends to rock the shaft in a clockwise direction. This shaft has an arm 25 secured thereto which carries a roller 26 for resting upon the film in the magazine. The spring 24 will keep the roller in engagement with the film as the roll of film decreases in diameter as it is being fed through the apparatus. The arm 25 is provided with a projection or dog 27 so that as the said arm moves downwardly under the action of its spring, said dog 27 is tilted upwardly against the arm 18 so as to tilt said arm to cause it to depress link 17 and thus rock the segmental gear 16, or 16' to cause the same to move clutch shaft 14 through the gear 15 and thus shift the clutch 13. The means for driving shaft 6 from stub shaft 7 consists of a beveled gear 60 on shaft 7 meshing with a like gear 61 loosely mounted on shaft 6. This gear 61 has formed therewith a pinion 62 which meshes with a pinion 63 keyed to a stub shaft 64. This stub shaft carries a wide pinion 65 which is slidably mounted on the shaft but is held against rotary movement thereon. This pinion is rotatably connected with a member 66, slidably mounted on the shaft 64 and having an upwardly extending part 67 having a hole therein to receive the shaft 68 which is mounted in the U-shaped part of a bracket 69. The main part of this bracket is provided with a screw threaded opening to receive a screw threaded part 70 on shaft 6 so that said bracket is moved longitudinally on the shaft when the same is rotated. Springs 71 are located on the shaft 68, one on each side of the part 67 and these springs tend to hold the part 67 midway the ends of the shaft 68. An arm 72 has a pin and slot connection with the bracket 69, as shown at 73, and the lower end of the arm carries a cross head 74 which engages with the cross pieces 75 on the spring latch members 76 which are adapted to engage the projections 77 on the member 66. Pinions 78 and 78' are rotatably mounted on shaft 6 adjacent the gear 61 and these pinions carry pawls 79 and 79' which engage ratchets 80 and 80' which are secured to shaft 6. The pawl or dog 79 is oppositely arranged to dog 79' so that when one dog is ratcheting the other is in engagement with its ratchet, thus the gear 78 will drive shaft 6 in one direction and gear 78' in an opposite direction, these gears 78 and 78' being rotated by the pinion 65 when engaged by said pinion.

It will thus be seen that when the shaft 7 is being rotated in one direction the gear 60 engaging with gear 61 will rotate the same upon shaft 6 and this movement will be communicated to shaft 64 through the pinions 62 and 63 so that pinion 65 will be rotated and this pinion will drive pinion 78' which in turn will drive shaft 6 through the pawl 79' and ratchet 80'. This movement of shaft 6 will shift the clutch 5 as before explained and it will also cause the bracket 69 to move longitudinally so that one of the springs 71 will be compressed between the bracket and the part 67 of member 66, said member being prevented from movement by the latch member 76. However, just about the time that the clutch 5 has been shifted into engagement with the pinion 3 the movement of the bracket will cause the head 74 on arm 72 to depress the latch member out of engagement with the projection 77 so that the spring 71 will force member 66 and pinion 65 forwardly into engagement with pinion 78 and thus cause pinion 78 to be rotated. However, as the dog 79 on this pinion will be ratcheting the shaft 6 will come to rest and the parts will remain in this position until the mechanism is released by the unwinding of the film when gear 78 will be caused to rotate in an opposite direction so that its dog will engage the ratchet and thus cause the shaft to revolve in an opposite direction to shift the clutch 5 into engagement with pinion 4 and to return the bracket 69 and its attached parts to their former position.

It will thus be seen that as the roll of film in either one of the upper magazines is wholly unwound the parts above described will act to shift the clutch 5 so as to connect either the bevel gear 3 or 4 with the drive shaft, the said clutch 5 being moved by screw 6 which is driven from the main shaft 2 by means of the shaft 7, and its connections with shaft 6, bevel gears 8 and 9 or 10, shaft 11 and pinions 12. It will of course be understood that when the film of one projecting apparatus has been run through the machine the parts will actuate the clutch 13 to connect the bevel gear 9 with shaft 11, the gear 10 idling, and when the film in the other projecting apparatus has been reeled off the clutch will be shifted in the opposite direction to connect the gear 10 with shaft 11 so that the screw 6 and its clutch will be moved in the opposite direction.

A stub shaft 28 carries a beveled gear 29 which meshes with the gears 3 and 4 so that said shaft 28 is driven in one direction when the clutch is connected with gear 3 and in the opposite direction when said clutch is connected with gear 4. A shaft 30 is geared to shaft 28 by the gears 31 and 32 and this shaft 30 is geared to a stub shaft 33 by the bevel gears 34. This shaft 33 carries a bevel gear 35 which meshes with the bevel gears 36 which are connected by ratchet mechanism 37 with the shafts 38 and 38' of the film feeding mechanism of the projecting machines A and B. The ratchet mechanism 37 for shaft 38 will permit the gear of said shaft to drive said shaft when said gear is rotated in one direction but the gear will idle on the shaft when it is being driven in the opposite direction. The ratchet mechanism for the shaft 38' is oppositely arranged so that as the feeding mechanism of one projecting machine is being actuated the other is standing still and vice versa.

A shaft 39 carries a gear 40 which meshes with gear 32 and this shaft 39 also carries a beveled gear 41 which meshes with the bevel gears 42 and 42' which are carried by a screw shaft 43 which is located under the supporting structure of the lamp house C. This screw shaft passes through the frame 44 on which the lamp house is adjustably mounted in the ordinary manner and this frame 44 is slidably mounted on the guides 45 so that as the screw is rotating in one direction or the other the frame 44 will be caused to move so as to place the lamp house behind either one projecting machine or the other. The gears 42 and 42' are rotatably supported on shaft 43 but are adapted to be connected with said shaft by the clutch 46 which at each end carries a rotatable part 47 having a set of ratchet teeth 48 with which is adapted to engage a pawl 49 carried by the adjacent end of the main part of the clutch. Thus the clutch can be moved into engagement with one of the beveled gears and unless said beveled gear is rotating in the proper direction it will not rotate the shaft 43 as the pawl will simply ride over the ratchet teeth. When the gear is driven in the proper direction, however, the pawl will engage the ratchet teeth and thus the gear will be connected with the shaft so that the shaft will be revolved. The clutch is shifted when the frame 44 reaches each end of its movement as said frame will strike spring stops 50 located on a sliding rod 51 which is connected with the clutch by means of the lever 52.

In order to hold rod 51 against movement until actuated by the lamp frame I provide a spring controlled latch member 51' which engages the wedge-shaped projection 51" on the bar 51, as shown in Figure 1, and this arrangement acts to prevent the clutch from stopping in neutral position.

It will thus be seen that when the lamp house reaches one end of its movement its frame striking stop 50 will cause the connecting parts to shift the clutch to disengage it from gear 42 and connect it with gear 42'. As shaft 39 is being driven in one direction by its connection with the drive shaft 2, gear 42 will be idling on shaft 43 as the clutch is out of connection with said gear. Said clutch is in engagement with gear 42' but as said gear 42' is being driven by gear 41 in a direction whereby the pawl 49 will ride over the ratchet teeth 48 said gear 42' will also be idling on shaft 43 and thus said shaft will be at rest and the lamp house will remain stationary. As soon as shaft 39 begins to rotate in a reverse direction, by the means hereinbefore described, gear 42' will be rotated in an opposite direction so that its ratchet mechanism will engage it with the shaft 43 so that said shaft is rotated and the lamp house will be moved behind the other projecting machine.

From the foregoing it will be seen that as soon as the film has been passed through one projecting apparatus said apparatus will be brought to rest and the other apparatus started up to feed its film therethrough. The lamp house will also be moved from the apparatus through which the film has just been fed to the other apparatus so as to furnish light thereto. Thus the delay of removing the old film from the apparatus and placing a new film therein is avoided so that the elapse of time between the showing of two films is very short and the operator has ample time in which to remove the shown film and replace it by a new one. By my invention the waits between the showing of the different films are reduced to a minimum and the work of the operator is also greatly reduced.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. In combination with a pair of projecting machines and a lamp house, a drive shaft, a shaft geared to the feeding means of the machine, said means including ratchet mechanism arranged to permit the feeding mechanism of one machine to remain stationary as the feeding means of the other machine are being rotated, gearing connecting said shaft with the drive shaft, such gearing being arranged to drive said shaft in either one direction or the other, clutch means for controlling the operation of the gears to drive said shaft in one direction or the other and means for shifting the clutch means when the film has been unwound from the reel in the upper magazine.

2. In combination with a pair of projecting machines and a lamp house, a drive shaft, a shaft geared to the feeding means of the machines, said means including ratchet mechanism arranged to permit the feeding mechanism of one machine to remain stationary as the feeding means of the other machine are being rotated, gearing connecting said shaft with the drive shaft, such gearing being arranged to drive said shaft in either one direction or the other, clutch means for controlling the operation of the gears to drive said shaft in one direction or the other, means for shifting the clutch means when the film has been unwound from the reel in the upper magazine and means connected with the drive shaft for shifting the lamp house from one machine to the other.

3. An apparatus of the class described comprising a pair of projecting machines having a lamp house, a drive shaft, a pair of beveled gears thereon, a stub shaft, a beveled gear thereon meshing with the before mentioned gears, a clutch for connecting the first mentioned gears with the drive shaft, clutch shifting means including a member engaging with the roll of film in the upper magazine of each machine and means operated thereby when the film has been unwound from said magazine for shifting the clutch, a shaft geared to the stub shaft, a beveled gear on said shaft, beveled gears meshing therewith and located on the shafts of the film feeding means of the two machines, ratchet mechanism connecting said beveled gears to the said feeding shafts, a slidable frame carrying the lamp house, a screw shaft engaging said frame, beveled gears on said screw shaft, a beveled gear meshing with the same, a shaft carrying the last mentioned bevel gear and geared to the stub shaft, a clutch engaging with the gears on the worm shaft and having at each end thereof a rotatable part, ratchet mechanism connecting each rotatable part with the main part of the clutch and means actuated by the movement of the lamp house for shifting said clutch.

In testimony whereof I affix my signature.

HAROLD JOS. BELCHER.